United States Patent [19]
Frisch et al.

[11] Patent Number: 5,656,783
[45] Date of Patent: Aug. 12, 1997

[54] OPTICAL APPARATUS FOR MEASURING DEFORMATION OF A BODY

[75] Inventors: Ernst Georg Frisch, Munich; Walter Braumandl, Thurmansbang, both of Germany

[73] Assignee: Sensor Instruments GmbH, Thurmansbang, Germany

[21] Appl. No.: 577,762

[22] Filed: Dec. 22, 1995

[30] Foreign Application Priority Data

Dec. 24, 1994 [DE] Germany .................. 44 46 760.5

[51] Int. Cl.⁶ .................................................. G01L 1/24
[52] U.S. Cl. ................................................... 73/800
[58] Field of Search ........................... 73/800, 831, 805, 73/847, 849

[56] References Cited

U.S. PATENT DOCUMENTS

| | | | |
|---|---|---|---|
| 4,275,599 | 6/1981 | Kohlenberger | 73/774 |
| 4,409,842 | 10/1983 | Scott et al. | 73/800 |
| 4,777,358 | 10/1988 | Nelson | 73/800 |
| 5,298,964 | 3/1994 | Nelson et al. | 73/800 |
| 5,374,821 | 12/1994 | Muhs et al. | 73/800 |
| 5,461,927 | 10/1995 | Bobb et al. | 73/800 |

FOREIGN PATENT DOCUMENTS

| | | |
|---|---|---|
| 0074697 | 3/1983 | European Pat. Off. . |
| 2264496 | 11/1973 | Germany . |
| 2606434 | 8/1977 | Germany . |
| 3625098 | 2/1987 | Germany . |
| 4332807 | 4/1994 | Germany . |
| 406265416 | 9/1994 | Japan .................. 73/800 |
| 1111145 | 4/1968 | United Kingdom . |

*Primary Examiner*—George M. Dombroske
*Assistant Examiner*—Max H. Noori
*Attorney, Agent, or Firm*—Hodgson, Russ, Andrews, Woods & Goodyear LLP

[57] ABSTRACT

An apparatus for measuring deformation of a body includes a transmitting optical fiber for connection to a light source and having a light exit face for radiating light, and at least first and second receiving optical fibers which have their light entrance faces adjacent to each other and which can each be connected to a respective input of an evaluation unit. The optical fibers are so arranged that upon deformation of the body there is a change in the difference between the amounts of light impinging on the light entrance faces of the receiving optical fibers.

39 Claims, 5 Drawing Sheets

OPTICAL APPARATUS FOR MEASURING DEFORMATION OF A BODY

FIELD OF THE INVENTION

The invention concerns an apparatus for measuring deformation of a body.

BACKGROUND OF THE INVENTION

In the measurement art the aim of measuring deformation phenomena such as bending, stretching, upsetting and the like with a high degree of accuracy arises in many different ways and situations. One form of apparatus for measuring deformation of a body, as is to be found in DE 43 32 807 A1, provides a light exit face for radiating light and a light entrance face which can be connected to an evaluation unit, for receiving at least a part of the light emitted by the light exit face. The light exit face and the light entrance face are mounted on the body in such a way that the position thereof relative to each other alters upon deformation of the body. In that arrangement the body has a through bore, into which a transmitting optical fiber providing the light exit face is inserted from one side while inserted into the through bore from the other side is a receiving optical fiber affording the light entrance face, so that the light exit and entrance faces are disposed in mutually opposite relationship at a spacing from each other. When deformation of the body occurs the amount of light which passes from the light exit face into the light entrance face alters. In a further construction the body which can be fixed for example by way of feet and clamping straps to the tail portion of a pair of welding tongs is formed by a plate which carries two blocks at a spacing from each other, with a weakening line between the blocks. One block is provided with two through bores which extend at an angle relative to each other and whose axes intersect at a mirrored surface which is provided on the other bore. A transmitting optical fiber is fitted into one bore and the receiving optical fiber is fitted into the other bore. Upon deformation of the carrier plate the amount of light which passes from the transmitting optical fiber by way of the mirrored surface onto the receiving optical fiber alters.

A particularity of the above-indicated apparatus or optoelectronic sensor is that the measurement signal not only depends on the deformation of the main body, but is in addition proportional to the amount of radiated light. As a result, a calibration operation is required before each measurement procedure. In addition, it is not possible to infer from the measurement signal the direction of deformation of the body, and therefore such direction has to be determined by additional measuring operations, with their attendant costs.

SUMMARY OF THE INVENTION

An object of the present invention is to provide an apparatus for measuring deformation of a main body, which substantially manages without calibration and which is highly accurate in operation and which makes it possible to determine the magnitude of such deformation and the direction thereof.

Another object of the present invention is to provide an apparatus for measuring magnitude and direction of deformation of a body, which is of a simple design configuration and which affords reliability of operation in a wide variety of different operation situations.

Still another object of the present invention is to provide an apparatus for measuring deformation of a body which can afford a high level of operational reliability even in environments which might otherwise be adverse in terms of achieving accurate measurement results.

In accordance with the present invention the foregoing and other objects are achieved by an apparatus for measuring deformation of a body comprising an evaluation means having a plurality of inputs. A light exit face for radiating light and at least first and second mutually adjacent light entrance faces for receiving light emitted from the light exit face are mounted by the body in such a way that the position thereof relative to each other alters upon deformation of the body. The light entrance faces are connected to respective inputs of the evaluation means. The light exit and light entrance faces are so arranged that upon deformation of the body the difference between the amounts of light impinging on the light entrance faces from the light exit face changes.

As will be seen in greater detail from the following description of a preferred embodiment of the apparatus in accordance with the principles of the present invention the fact that the apparatus operates with first and second mutually adjacent light entrance faces means that it is possible to derive a difference signal which, in particular if the light entrance faces receive the sane amounts of light, is independent of the intensity of the light issuing from the light exit face, so that calibration operations are required at most only to a slight degree. It is also possible to deduce the direction of deformation of the body by individual evaluation of the amounts of light involved or by taking into consideration the sign of the difference signal.

Further preferred features of the apparatus in accordance with the present invention are set out hereinafter in the following description of a preferred embodiment and in the accompanying claims.

Further objects, features and advantages of the apparatus according to the present invention will be apparent from the following description of preferred embodiments of the invention.

DESCRIPTION OF PREFERRED EMBODIMENTS

Figure 1:
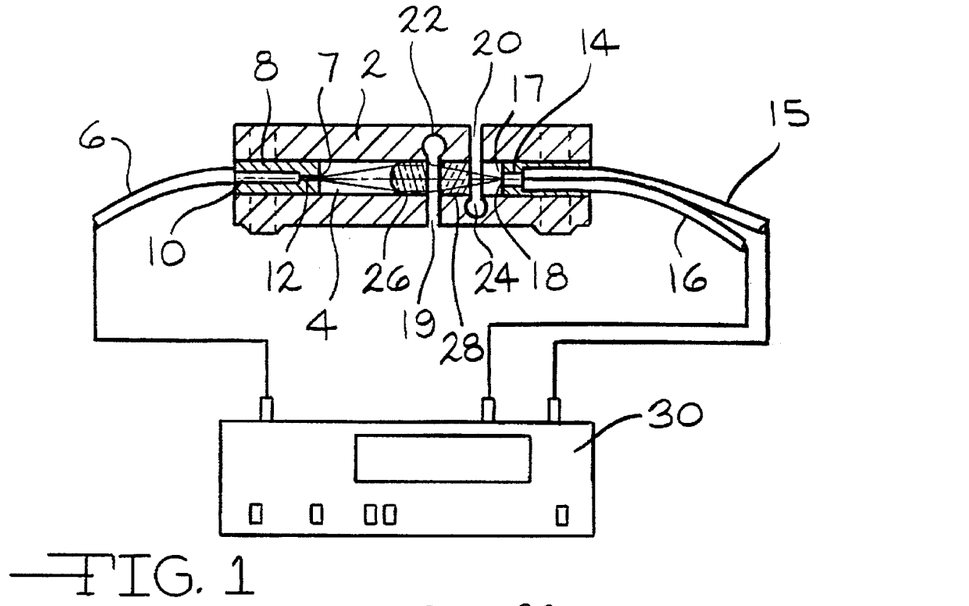
FIG. 1 is a sectional side view of a first embodiment of the apparatus according to the invention, diagrammatically illustrating an associated measuring or evaluation unit.

Referring firstly to FIG. 1 a main body 2 therein, which can comprise any suitable material such as metal, for example Titanal, or plastic material, has a through bore serving as a passage as indicated at 4. Fitted into the passage 4 from one side thereof, at the left in FIG. 1, is a transmitting optical fiber 6 which is provided outside the body 2 with a protected casing or sheath and which within the body 2 is accommodated within a sleeve insert 8 initially in a bore 10 of larger diameter and then terminates in a bore 12 of smaller diameter with its light exit face 7 at the free end of the bore 12. The optical fiber may be a plastic optical fiber for example of a diameter of about 1 mn and the aperture of the issuing light beam is then about 67°. When an optical fiber of glass is used the aperture is then usually about 22° or 67°.

Two receiving Optical fibers 15 and 16 are inserted in a similar manner into a sleeve insert 14 from the opposite end of the body 2, that is to say from the right-hand side in FIG. 1. The optical fibers 15 and 16 have light entrance faces 17 and 18 which are disposed at the inner end of the sleeve insert 14 in immediately adjacent relationship perpendicularly one above the other.

The body 2 is provided with first and second perpendicular slots 19 and 20 which are of such a nature that a first pivot axis 22 is defined adjacent the top side of the main body 2 while a further pivot axis 24 is defined adjacent the underside thereof. A lens 26 is fitted into the passage 4, adjacent to the slot 19. A plane-parallel plate 28 is fitted into the passage 4 between the two slots 19 and 20. The spacings between the light exit face 7 of the transmitting optical fiber 6, the light entrance faces 17 and 18 of the receiving optical fibers 15 and 16, the focal length of the lens 26 and the thickness and the refractive index of the plane-parallel plate 28 are so matched to each other that the image of the light exit face 7 is formed through the lens 26 and the plate 28 on the light entrance faces 16 and 17 symmetrically relative to the latter, that is to say the image of the center of the light exit face 7 is projected onto the center between the two light entrance faces 17 and 18.

The transmitting optical fiber 6 is supplied by a control device 30 with light, for example from an infra-red light source, a laser or a light-emitting diode. The receiving optical, fibers 15 and 16 are connected to separate inputs of the control device 30 which can thus operate as an evaluation unit so that after opto-electronic conversion the amounts of light received by the receiving optical fibers can be individually evaluated and superimposed, for example they can be subtracted from each other.

Figure 2:
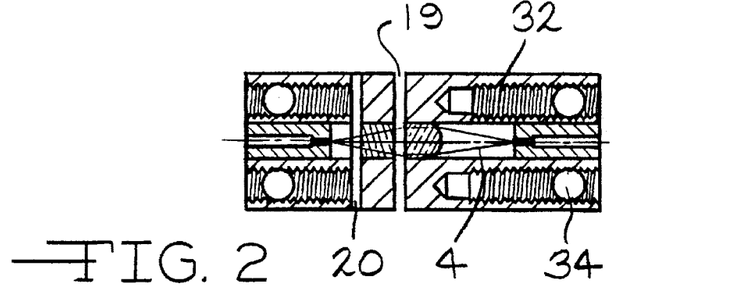
FIG. 2 is a horizontal section through the embodiment of the apparatus shown in FIG. 1.
Figure 3:
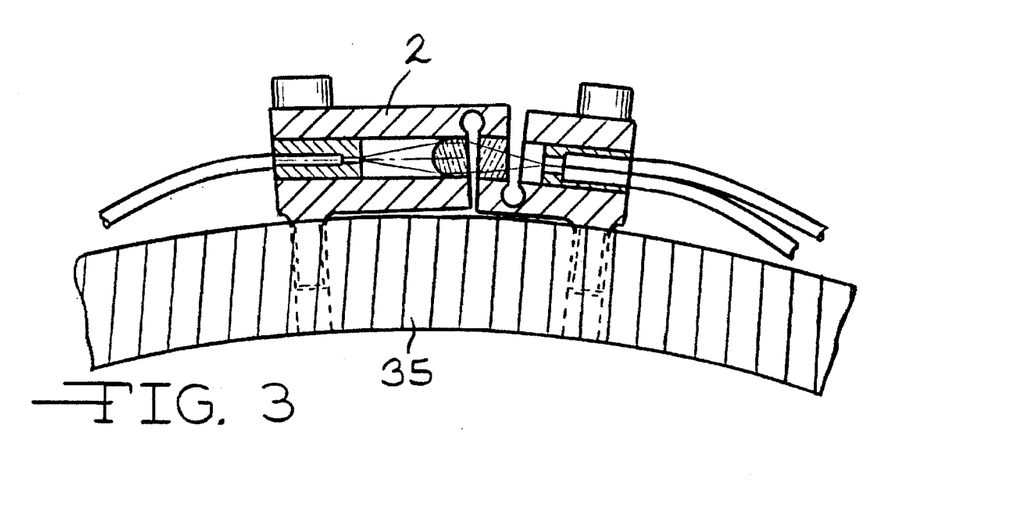
FIG. 3 shows the apparatus of FIGS. 1 and 2 fixed on an article of which deformation is to be measured.

Reference will now additionally be made to FIG. 2 showing a view in horizontal section through the arrangement illustrated in FIG. 1. In addition, horizontal and perpendicular fixing bores 32 and 34 can be seen from FIG. 2, with which the body 2 can be fixed in a simple manner to an article whose deformation is to be measured, such article being indicated generally at 35 in FIG. 3. FIG. 3 thus shows the apparatus of FIGS. 1 and 2 fixed to an article 35 of which flexural deformation is to be measured.

The structure of the apparatus according to the invention as illustrated in FIGS. 1 through 3 having been described, the mode of operation thereof is as follows:

In the non-deformed condition of the body 2 the sane amount of light impinges on each of the two receiving optical fibers 15 and 16 from the transmitting optical fiber 6. If the main body 2 is for example stretched, it is deformed at its pivot axes 22 and 24 whereby the plane-parallel plate 28 is rotated in the counter-clockwise direction as viewing in FIG. 1, to correspond to the configuration shown in FIG. 3, so that the image of the light exit face 7 which is formed through the plane-parallel plate 28 is displaced upwardly and the optical fiber 15 which is disposed above the other optical fiber 16 in FIG. 1 will thus receive more light, as can be clearly seen from FIG. 3. If on the other hand the body 1 is upset, the optical fiber 16 will in turn receive more light. It will be seen therefore that upon deformation of the body 2 the difference between the amounts of light impinging on the light entrance faces 15 and 16 changes. That alteration can thus be evaluated and assessed in the evaluation unit afforded by the control device 30, by virtue of the light entrance faces 17 and 18 each being connected to a respective input of the control device 30 for supplying evaluatable measurement signals thereto.

Figure 4:
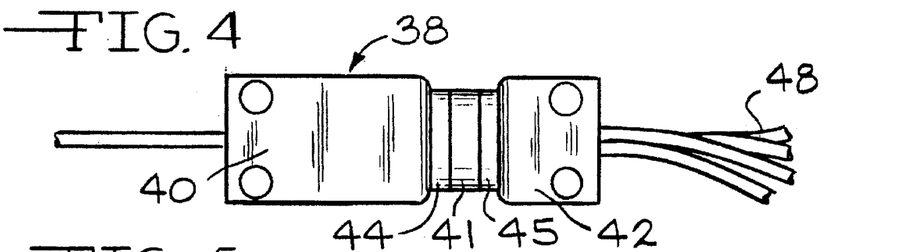
FIG. 4 is a side view of a modified embodiment of an apparatus according to the invention.
Figure 5:
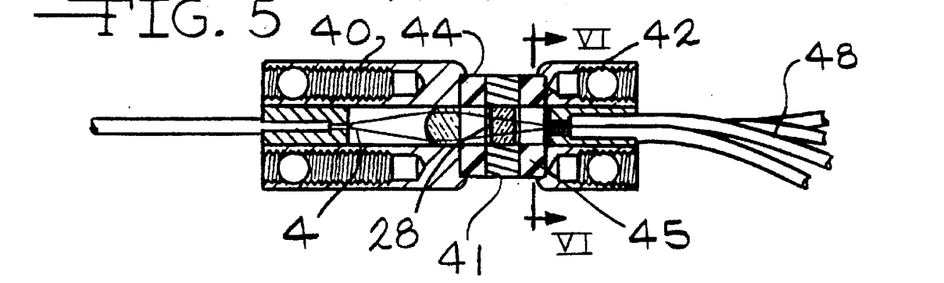
FIG. 5 is a central section through the FIG. 4 apparatus.
Figure 6:
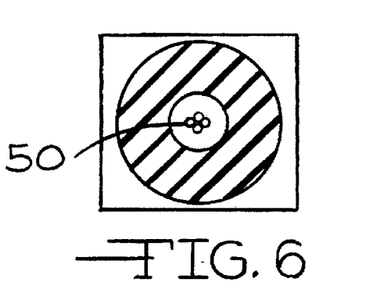
FIG. 6 is a view of the apparatus shown in FIG. 5 taken in section along line VI—VI, on an enlarged scale.

Reference will now be made to FIGS. 4 through 6 showing a modified embodiment of the measuring apparatus according to the invention. In this embodiment the body 38 is composed of three portions indicated at 40, 41 and 42. A central portion 41 which accommodates in itself the plane-parallel plate 28 is connected to the other two end portions 40 and 42 of the body 38 by way of elastomer portions 44 ans 45 formed in this embodiment by two rubber rings which are vulcanised in place. As a result of their flexibility the rubber rings 44 and 45 perform the pivoting function of the pivot axes 22 and 24 of the embodiment described above with reference to FIGS. 1 through 3. In this case it will be noted that deformability of the body 38 is possible not only about a horizontally disposed axis but also about perpendicularly disposed axes. Accordingly this embodiment has four receiving optical fibers 48 whose light entrance faces 50, as shown in FIG. 6, are arranged in a generally cross-shaped juxtaposed configuration. An additional advantage of the configuration of the apparatus shown in FIGS. 4 through 6 is that the passage 4 through the body 38 and the light faces and optical components arranged therein are reliably protected from fouling and contamination by the rubber rings 44 and 45.

Figure 6A:
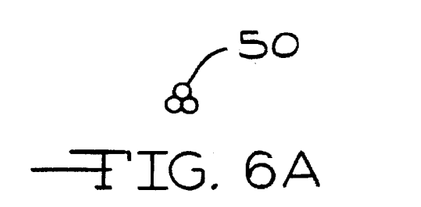
FIG. 6a is a detail view of a modified arrangement of light entrance faces.

As shown in FIG. 6a, the arrangement may also be such that three optical fibers affording light entrance faces 50 are disposed in such a way that the centers of the respective light entrance faces are in the corners of an equilateral triangle and the optical fibers are in contact with each other.

Figure 7:
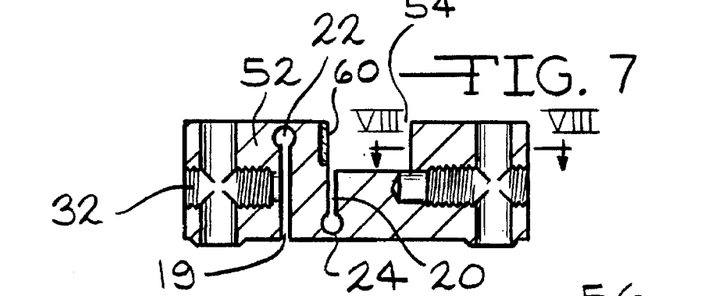
FIG. 7 is a perpendicular section through a further embodiment of an apparatus according to the invention.
Figure 8:
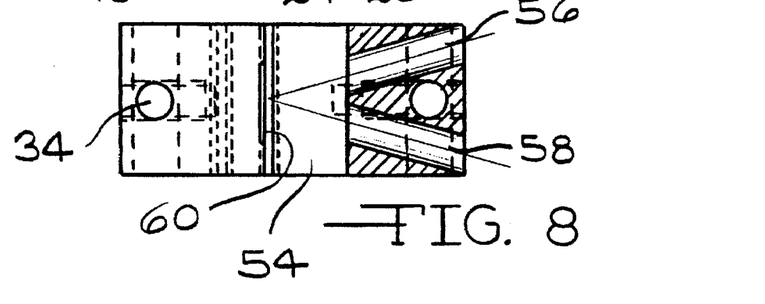
FIG. 8 is a view of the apparatus of FIG. 7 in section taken along line VIII—VIII in FIG. 7.

Referring now to FIGS. 7 through 10, shown therein is yet another modified embodiment of the apparatus according to the invention, which differs from the above-described embodiments in particular by virtue of the fact that it does not operate in a transmitted-light mode but in a reflection mode. As illustrated in FIG. 7, the apparatus of FIGS. 7 through 10 has a main body indicated generally at 52, which again has first and second slots 19 and 20 for defining pivot axes 22 and 24 at which the body 52 can deform. On the side of the slot 50 which is at the right in FIG. 7 the body 52, in its upper region, is provided with an opening 54 from which two through bores serving as passages 56 and 58 extend through the part of the body 52 which is at the right in FIG. 7. The passages 56 and 58 are arranged in angular relationship with each other in such a way that their axes intersect at a surface 60 which is exposed towards the opening 54 and which is preferably mirrored. The angular relationship of the passages 56 and 58 can be clearly seen for example in FIG. 8.

Figure 9:
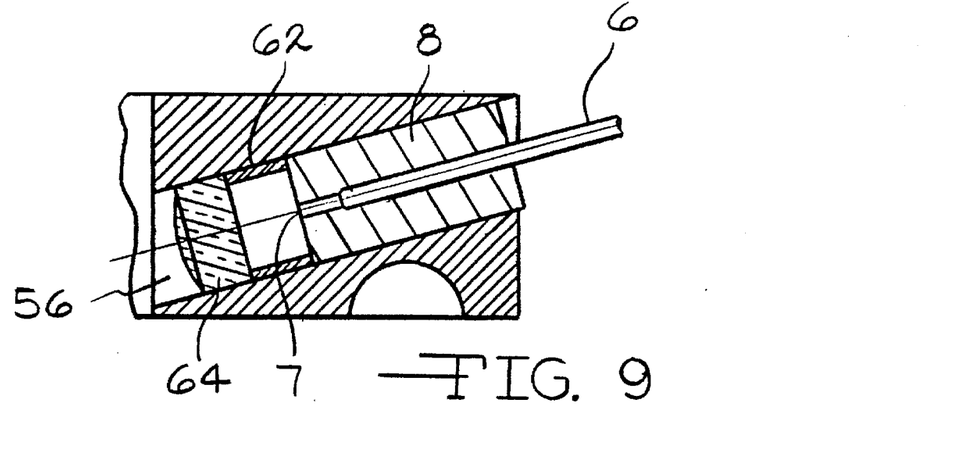
FIG. 9 is a detail view on an enlarged scale from FIG. 8.

As shown in FIG. 9, a transmitting optical fiber 6 is fitted into the passage 56 in a similar manner to the optical fiber fitted into the passage 4 in the embodiment shown in FIG. 1. The transmitting optical fiber 6 has a light exit face 7 which is exposed at the side of the sleeve insert 8 which faces inwardly. Disposed at a spacing from the sleeve insert 8, such spacing being determined by a spacer sleeve 62, within the passage 56, is a convergent lens 64 which puts into a parallel condition the divergent light issuing from the light exit face 7 of the optical fiber 6.

Figure 10:
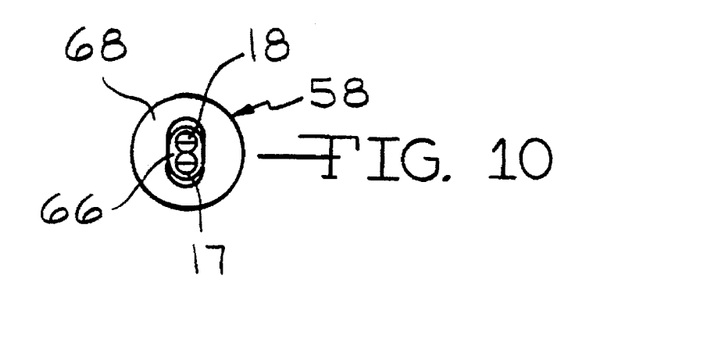
FIG. 10 is a front view of two mutually adjacent receiving optical fibres.

In an entirely similar fashion, two receiving optical fibers are fitted into the passage 58, with their light entrance faces 17 and 18 being disposed perpendicularly one above the other as shown in FIG. 10. Disposed within the passage 58 in front of the light entrance faces of the receiving optical fibers is a convergent lens whereby the image of the parallel light reflected by the mirrored surface 60 is formed symmetrically on the light entrance faces, when the body 52 is in a non-deformed condition. FIG. 10 is a view onto the light entrance faces 17 and 18 of the receiving optical fibers, which are disposed in the passage 58. It will be seen that the receiving optical fibers in the passage 58 are surrounded in their end region by a common casing or sheath 66 which is accommodated as a firm fit in a passage, of generally elongate or oval cross-sectional configuration, through the sleeve 68.

The mode of operation of the apparatus described above with reference to FIGS. 7 through 10 is as follows:

If the body 52 is upset or stretched or flexed, then, as a result of the tilting movement of the axes of the passages 56 and 58 relative to the reflection surface 60, the image of the light exit face on the light entrance faces moves thereon so that it is possible to ascertain the deformation of the body 52, in respect of magnitude and direction. The evaluation operation in that respect is conducted in an evaluation unit which is not shown in FIGS. 7 through 10 but which is appropriately connected to the apparatus illustrated therein, for example in the same manner as the evaluation unit 30 shown in FIG. 1.

Figure 11:
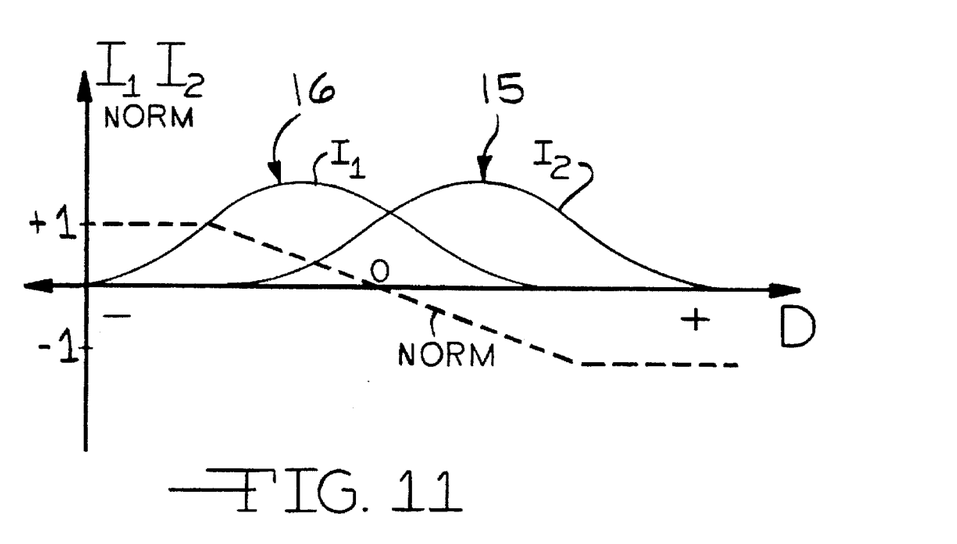
FIG. 11 shows curves to illustrate a measuring principle.

FIG. 11 diagrammatically shows an example of a measurement principle as can be applied with the apparatus according to the invention.

Let it be assumed that the body 2 of the embodiment shown in FIG. 1 is not deformed so that the image of the light exit face 7 is formed at the center between the light entrance faces 17 and 18 and the two receiving optical fibers 15 and 16 receive the same amounts of light $I_1$ and $I_2$ respectively. If now the main body 2 is stretched or elongated (+), the amount of light received by the receiving optical fiber 15 initially increases whereas the amount of light received by the receiving optical fiber 16 immediately decreases. The increase in the amount of light received by the receiving optical fiber 15 concludes when the image of the light exit face 7 goes beyond the light entrance face of the receiving optical fiber 15. The conditions are reversed if the body 2 is upset (−). If now a standard signal is formed from $I_1$ and $I_2$, which signal is of the value $I_1-I_2/I_1+I_2$, then the broken line shown in FIG. 11 is produced in dependence on the stretching or upsetting effect. It is immediately apparent that this standard signal permits a direct conclusion to be drawn about deformation of the body 2 or an article to which the body 2 is fixed.

Figure 12:
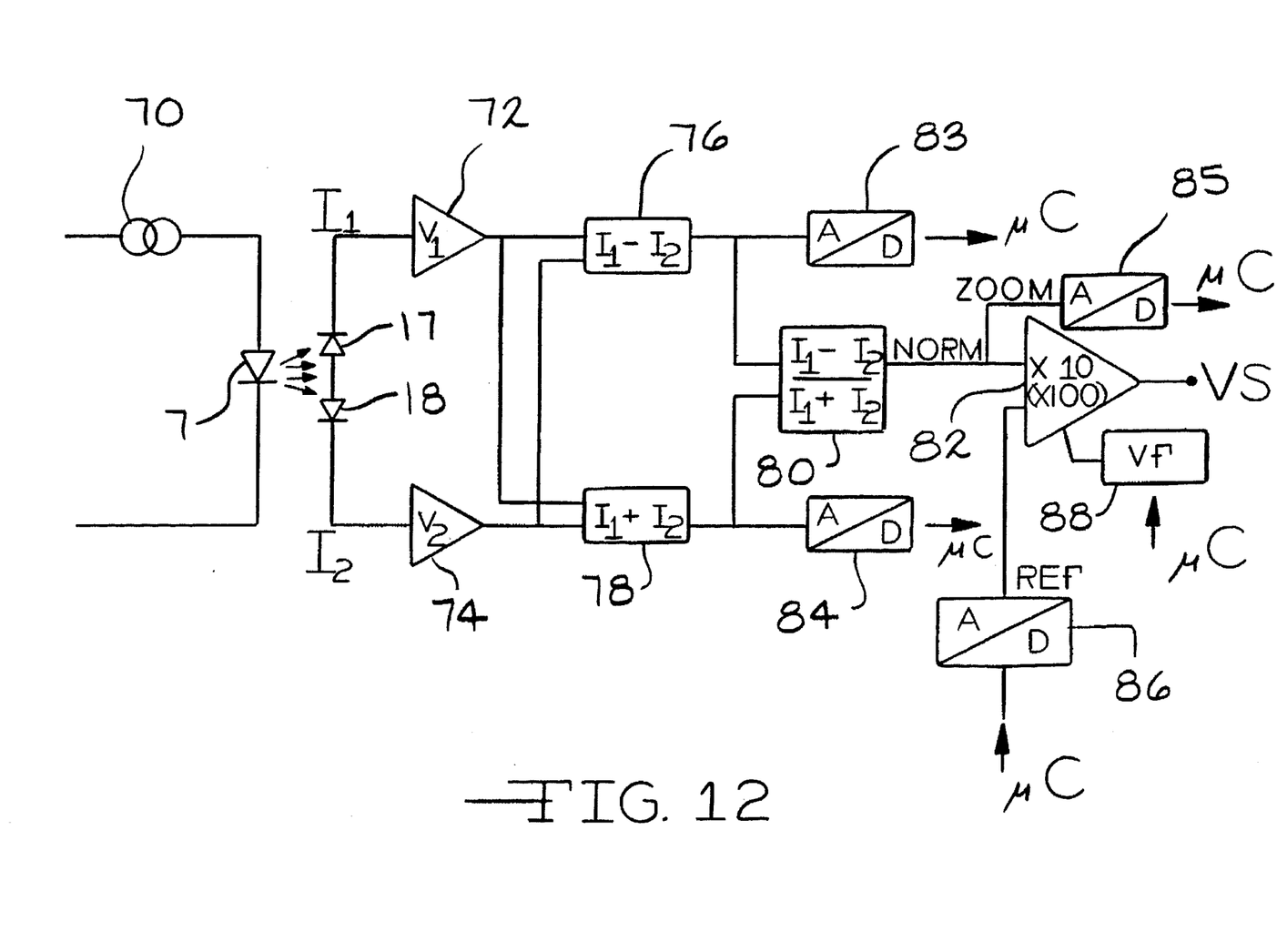
FIG. 12 shows a block circuit diagram of an evaluation unit.

FIG. 12 shows the configuration of a control device or evaluation unit 30, as indicated in FIG. 1. The control device 30 includes a light source 70 from which light is passed to the light exit face 7. The light which thus issues from the light exit face 7 acts on the mutually adjacent light entrance faces 17, 18 in corresponding amounts, those amounts of light being passed in the form of measurement signals $I_1$ and $I_2$ to amplifiers 72 and 74. Connected on the output sides of the amplifiers 72 and 74 are a subtracting member 76 and an adding member 78 which in turn are connected to a dividing member 80 which is connected to an input of an amplifier 82. The outputs of the subtracting member 76, the adding member 78 and the dividing member 80 are each connected by way of respective A/D-converters 83 through 85 to a computer (µC) whose output is connected by way of a further A/D-converter to the other input of the amplifier 82. The amplifier 82 is connected to a control member 88 which is controlled by the computer for setting or re-adjusting the gain factor of the amplifier 82.

The mode of operation of the above-described Circuit is as follows:

The measurement values corresponding to the amounts of light $I_1$ and $I_2$ are amplified in the amplifiers 72 and 74. The difference of $I_1$ and $I_2$ is formed in the subtracting member 76 and the sum thereof is formed in the adding member 78. The dividing member 80 produces at its output a standard signal which corresponds to the value $I_1-I_2/I_1+I_2$. In the rest condition of the measuring apparatus, that is to say when there is not yet any deformation to be measured, that standard signal is fed to a computer and stored therein. By way of the converter 86, that signal is passed as a reference signal to the amplifier 82, to the other input of which is applied the respective actual value of the standard signal. The amplification of the difference between the actual value of the standard signal and the reference signal produces at the output of the amplifier 82 the deformation signal VS which corresponds to the deformation of an article which is to be measured.

Figure 13:
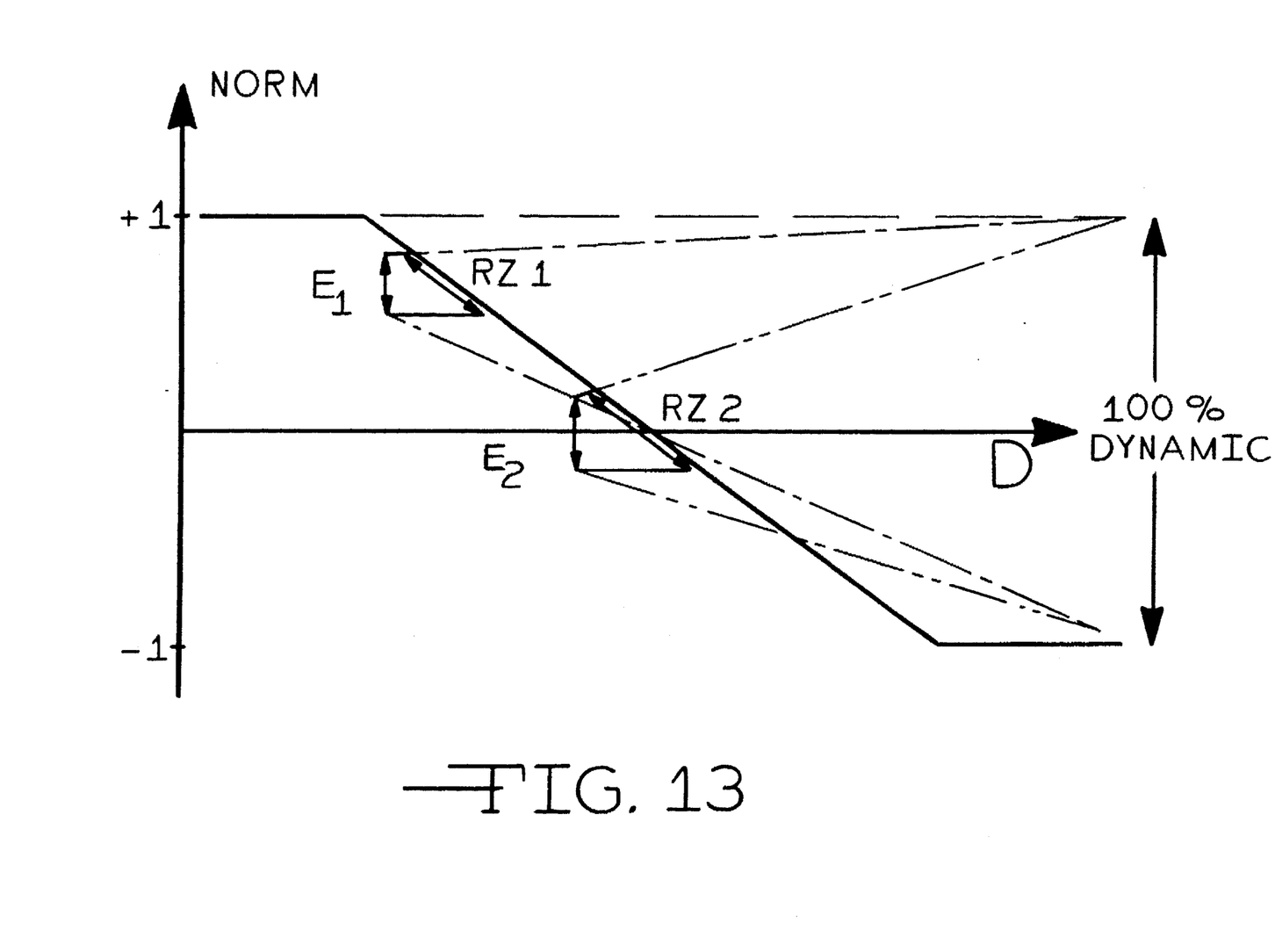
FIG. 13 is a diagram to show the mode of operation of the circuit shown in the block circuit diagram of FIG. 12.

With the described circuit, automatic calibration is firstly achieved insofar as, at the beginning of the measurement procedure, by virtue of suitable storage of the reference signal, the deformation signal representing the measurement result is set to zero. Furthermore, as illustrated in FIG. 13, it is possible, from each initial condition of a measurement operation, to make use of the entire dynamic range of the measurement apparatus.

Let it be assumed for example that the initial or rest condition of the measuring apparatus is at the location RZ1, because there is a bask deformation. Let it further be assumed that the entire deformation to be measured is in the region of the double arrow around RZ1 in FIG. 13 so that the dynamic range of the standard signal is only $E_1$. Now, by means of the reference signal formed in the rest condition RZ1, the dynamic range $E_1$ can be set to the total possible dynamic range of the apparatus by suitable selection of the gain factor of the amplifier 82. A similar consideration applies to the situation where the rest condition RZ2 is at the zero point, but the deformations to be measured are not so great that the entire dynamic range is used.

It will be appreciated that the above-described embodiment of the apparatus in accordance with the principles of the present invention have been set forth solely by way of example and illustration thereof and that many other modifications and alterations may be made therein without thereby departing from the spirit and scope of the invention. For example, the apparatus does not have to operate with optical fibers, but the light exit faces and light entrance faces can be afforded directly by appropriate opto-electronic components such as laser diodes or LEDs, differential diodes, quadrant diodes, and the like. It is also possible to use other evaluation circuits and algorithms which can provide information about the magnitude and direction of any deformation to be measured.

The apparatus according to the invention is suitable for many different uses, for example for radio transmitting masts in regard to force shunt flow, in the case of parabolic antennae for controlling the alternately acting wind forces, on aircraft wings for detecting overloading and for activating countermeasures, on robots, in particular grinding or welding robots for adjusting for flexural and torsional deformation phenomena which are caused by machining forces or by the robots' own weight, as control sensors in relation to cranes and remotely controlled systems, for measuring plugging forces in the case of plugs and contacts, for measuring tensile forces and the like. By virtue of optical measurement value detection the apparatus according to the invention can also be employed without any problems in areas involving very high levels of electrical interference.

What is claimed is:

1. Apparatus for measuring deformation of a body comprising:

an evaluation means having a plurality of inputs;

a light exit face for radiating light and at least first and second mutually adjacent light entrance faces for receiving light emitted by the light exit face;

means connecting the light entrance faces to respective inputs of the evaluation means;

the light exit face and the light entrance faces being disposed on the body in such a way that the position thereof relative to each other alters upon deformation of the body and being so arranged that upon deformation of the body the difference between the amounts of light impinging on the light entrance faces from the light exit face changes;

the body having a passage and the light exit face and the at least two light entrance faces being arranged in opposite relationship in said passage in the body;

a lens which in the non-deformed condition of the body forms the image of the light exit face at least substantially at the center of the light entrance faces; and the body having slots which extend from oppositely disposed sides between the light exit face and the light entrance faces and which are at least substantially perpendicular to the axis of the passage and which pass through the passage whereby first and second at least substantially mutually parallel pivot axes are formed on the body at the ends of the respective slots.

2. Apparatus for measuring deformation of a body comprising:

an evaluation means having a plurality of inputs;

a light exit face for radiating light and at least first and second mutually adjacent light entrance faces for receiving light emitted by the light exit face;

means connecting the light entrance faces to respective inputs of the evaluation means;

the light exit face and the light entrance faces being disposed on the body in such a way that the position thereof relative to each other alters upon deformation of the body and being so arranged that upon deformation of the body the difference between the amounts of light impinging on the light entrance faces from the light exit face changes;

the body having first and second passages extending at an angle to each other and defining axes which intersect at an intersection within the body;

the light exit face being arranged in the one passage and the at least first and second light entrance faces being arranged in the other passage; and in front of the light exit face a convergent lens having a focus at which said light exit face is disposed, in front of the light entrance faces a convergent lens having a focus at which the center of said light entrance faces is disposed, and on the body a reflection surface which is at least substantially perpendicular to the plane of the axes of the passages and at which said intersection is disposed.

3. Apparatus for measuring deformation of a body comprising:

an evaluation means having a plurality of inputs;

a light exit face for radiating light and at least first and second mutually adjacent light entrance faces for receiving light emitted by the light exit face;

means connecting the light entrance faces to respective inputs of the evaluation means;

the light exit face and the light entrance faces being disposed on the body in such a way that the position thereof relative to each other alters upon deformation of the body and being so arranged that upon deformation of the body the difference between the amounts of light impinging on the light entrance faces from the light exit face changes; and said evaluation means comprising a means for producing a standard signal which corresponds to the difference value of amounts of light received by the first and second adjacent light entrance faces, divided by the sum value of said amounts of light, a means for storage of a reference signal which corresponds to the standard signal with a given deformation of the body, and a means for the amplifying the difference from the standard signal in the event of deformation to be measured of a component to which the body is fixed, and the stored reference signal.

4. Apparatus for measuring deformation of an article comprising:

an evaluation means having a plurality of inputs;

a light exit face for radiating light and at least first and second mutually adjacent light entrance faces for receiving light emitted by the light exit face;

means connecting the light entrance faces to respective inputs of the evaluation means, wherein the light radiated from the light exit face is focused by a convergent optical system onto said light entrance faces and an optical member is positioned within the light path between said light exit face and said light entrance faces, which optical member changes upon the deformation of the body the difference between the amounts of lights impinging on the light entrance faces;

wherein said light exit face (7), said light entrance faces (17, 18), said convergent optical system (26, 64) and said optical member (28, 60) are mounted on an integral body adapted to be fixed onto said article;

said body being formed with slots, which extend from oppositely disposed sides, whereby parallel pivot axes (22, 24) are defined at the closed ends of said slots; and said optical member being mounted in a region of said body positioned between said pivot axes.

5. Apparatus as said forth in claim 4, wherein the body (2) has a passage (4) and said light exit face (7) and said at least two light entrance faces (17, 18) are arranged in opposite relationship within said passage in said body, said at least two light entrance faces are adjacent in a direction perpendicular to the direction of said pivot axes (22, 24), and said optical member is arranged in a part of said passage which is between said slots and is formed as a plate (28) having mutually parallel end faces which are towards said slots.

6. Apparatus as said forth in claim 5, wherein said optical system is formed as a convergent lens (26), which in a non-deformed condition of said body (2) forms the image of said light exit face at least substantially at the center of said light entrance faces (17, 18).

7. Apparatus as said forth in claim 6, wherein said convergent lens (26) is positioned in said passage (4) outside the region between said slots (19, 20).

8. Apparatus as said forth in claim 4, wherein
said body (52) has first and second passages (56, 58) extending at an angle to each other and defining axes which intersect at an intersection point;
the light exit face (7) is arranged in the one passage (56) and the at least first and second light entrance faces (17, 18) are arranged in the other passage (58); and
further including in front of said light exit face a convergent lens (64) having a focus at which said light exit face is disposed, on a region of said body between slots (19, 20) a reflection surface (60) which is at least substantially perpendicular to the plane of said axes of said passages, at which reflection surface said intersection point is disposed, and the body has an opening in the region between said convergent lenses and said reflection surface.

9. Apparatus as said forth in claim 8, wherein said pivot axes (22, 24) extend at least substantially parallel to the plane formed by the axes of said passages (56, 58) and at least two of said light entrance faces (17, 18) are adjacent in a direction perpendicular to said pivot axes.

10. Apparatus as said forth in claim 4, wherein further slots extend through said body, said further slots having ends defining further pivot axes, wherein individual ones of said pivot axes extend at least substantially perpendicular to each other.

11. Apparatus as said forth in claim 4, comprising at least three light entrance faces each adapted to be connected to a respective input of the evaluation means.

12. Apparatus as said forth in claim 11, wherein said adjacent light entrance faces are disposed at the corners of an equilateral triangle.

13. Apparatus as said forth in claim 4, comprising at least four light entrance faces each adapted to be connected to a respective input of the evaluation means.

14. Apparatus as said forth in claim 13, wherein said light entrance faces are adjacent in first and second mutually perpendicular directions.

15. Apparatus as set forth in claim 2 wherein said body has an opening in the region between said lenses and said reflection surface.

16. Apparatus as set forth in claim 15 wherein said body has between said lenses and said reflection surface a first slot having an end region providing a first pivot axis.

17. Apparatus as set forth in claim 16 wherein said first pivot axis extends at least substantially parallel to the plane formed by the axes of said passages, and at least two of said light entrance faces are arranged in mutually adjacent relationship in a direction at least substantially perpendicular to the first pivot axis.

18. Apparatus as set forth in claim 16 wherein a further slot extends through the body on the side of the first slot which is remote from said reflection surface, said further slot being disposed in opposite relationship to the first slot and defining a further pivot axis of the body, said further pivot axis being at least substantially parallel to the first pivot axis.

19. Apparatus as set forth in claim 1 wherein further slots extend through the body, said further slots having ends defining further pivot axes, wherein individual ones of said further pivot axes extend at least substantially perpendicularly to each other.

20. Apparatus as set forth in claim 16 wherein further slots extend through the body, said further slots having ends defining further pivot axes, wherein individual ones of said further pivot axes extend at least substantially perpendicularly to each other.

21. Apparatus as said forth in claim 4, comprising optical fibers following the light exit face and the light entrance faces.

22. Apparatus as said forth in claim 4, wherein said body is provided with fixing bores through which it can be screwed directly onto said article whose deformation is to be measured.

23. Apparatus as said forth in claim 4, wherein said evaluation unit includes:
a means for producing a standard signal which corresponds to the difference value of amounts of light received by the first and second adjacent light entrance faces, divided by the sum value of said amounts of light;
a means for storage of a reference signal which corresponds to the standard signal with the given deformation of the body; and
a means for amplifying the difference from the standard signal in the event of deformation to be measured of an article to which the body is fixed, and the stored reference signal.

24. Apparatus for measuring deformation of an article comprising:
an evaluation means having a plurality of inputs;
a light exit face for radiating light and at least first and second mutually adjacent light entrance faces for receiving light emitted by the light exit face;
means connecting the light entrance faces to respective inputs of the evaluation means, wherein the light radiating from the light exit face is focused by a convergent optical system onto said light entrance faces and an optical member is positioned within the light path between said light exit face and said light entrance faces, which optical member changes upon the deformation of the body the difference between the amounts of lights impinging on the light entrance faces;
wherein said exit face (7), said light entrance faces (17, 18), said convergent optical system (26, 64) and said optical member (28, 60) are mounted on a premounted body (38), which body has a central portion (44) and respective portions at each side thereof and elastomer portions connecting the central portion and said respective portions, said body being formed with a passage;
the light exit face and a convergent lens forming an image of said light exit face at the center of the light entrance faces being positioned in a region of said passage at one side of said central portion;
said light entrance faces being positioned in a region of said passage at the other side of said central portion; and
said optical member being formed as a plate (22) with mutually parallel end faces is accommodated in a region of said passage within said central portion.

25. Apparatus as said forth in claim 24, comprising at least three light entrance faces each adapted to be connected to a respective input of the evaluation means.

26. Apparatus as said forth in claim 25, wherein said adjacent light entrance faces are disposed at the corners of an equilateral triangle.

27. Apparatus as said forth in claim 24, comprising at least four light entrance faces each adapted to be connected to a respective input of the evaluation means.

28. Apparatus as said forth in claim 27, wherein said light entrance faces are adjacent in first and second mutually perpendicular directions.

29. Apparatus as said forth in claim 24, comprising optical fibers following the light exit face and the light entrance faces.

30. Apparatus as said forth in claim 24, wherein said bodies provided with fixing bores through which it can be screwed directly onto said article whose deformation is to be measured.

31. Apparatus as said forth in claim 24, wherein said evaluation unit includes:
- a means for producing a standard signal which corresponds to the difference value of amounts of lights received by the first and second adjacent light entrance faces, divided by the sum value of said amounts of light;
- a means for storage of a reference signal which corresponds to the standard signal with the given deformation of the body; and
- a means for amplifying the difference from the standard signal in the event of deformation to be measured of an article to which the body is fixed, and the stored reference signal.

32. Apparatus for measuring deformation of an article comprising:
- an evaluation means having a plurality of inputs;
- a light exit face for radiating light and at least first and second mutually adjacent light entrance faces for receiving light emitted by the light exit face;
- means connecting the light entrance faces to respective inputs of the evaluation means, wherein the light radiated from the light exit face is focused by a convergent optical system onto said light entrance faces and an optical member is positioned within the light path between said light exit face and said light entrance faces, which optical member changes upon the deformation of the body the difference between the amounts of light impinging on the light entrance faces;
- wherein said light exit face (7), said light entrance faces (17, 18), said convergent optical system (26, 64) and said optical member (28, 60) are mounted on an integral body (52) adapted to be fixed onto said article;
- said body having first and second passages (56, 58) extending at an angle to each other and having axes which intersect at an intersection point;
- the light exit face (7) being arranged in the one passage (56) and the at least first and second light entrance faces (17, 18) being arranged in the other passage (58); and
- further including in front of said light exit face a convergent lens (64) having a focus at which said light exit face is disposed, in front of the light entrance faces a convergent lens having a focus at which the center of said light entrance faces is disposed, said body being formed with a slot (20), extending at least substantially perpendicular to said passages, a wall of said slot being formed with a reflecting surface (60), which is positioned at the intersecting point of said passages, and at the closed end portion of said slot is formed a pivot axes (24) of said body, and the body has an opening (54) in the region between said convergent lenses and said reflection surface.

33. Apparatus as said forth in claim 32, comprising at least three light entrance faces each adapted to be connected to a respective input of the evaluation means.

34. Apparatus as said forth in claim 33, wherein said adjacent light entrance faces are disposed at the corners of an equilateral triangle.

35. Apparatus as said forth in claim 32, comprising at least four light entrance faces each adapted to be connected to a respective input of the evaluation means.

36. Apparatus as said forth in claim 35, wherein said light entrance faces are adjacent in first and second mutually perpendicular directions.

37. Apparatus as said forth in claim 32, comprising optic fibers following the light exit face and the light entrance faces.

38. Apparatus as said forth in claim 32, wherein said bodies provided with fixing bores through which it can be screwed directly onto said article whose deformation is to be measured.

39. Apparatus as said forth in claim 32, wherein said evaluation unit includes:
- a means for producing a standard signal which corresponds to the difference value of amounts of light received by the first and second adjacent light entrance faces, divided by the sum value of said amounts of light;
- a means for storage of a reference signal which corresponds to the standard signal with the given deformation of the body; and
- a means for amplifying the difference from the standard signal in the event of deformation to be measured of an article to which the body is fixed, and the stored reference signal.

* * * * *